United States Patent
Boughtwood (10) Patent No.: US 12,187,339 B2
(45) Date of Patent: Jan. 7, 2025

(54) SUSPENSION AND STEERING SYSTEMS FOR A VEHICLE

(71) Applicant: DEREGALLERA HOLDINGS LTD, Mid Glamorgan (GB)

(72) Inventor: Martin Hugh Boughtwood, South Glamorgan (GB)

(73) Assignee: DEREGALLERA HOLDINGS LTD (GB)

( * ) Notice: Subject to any disclaimer, the term of this patent is extended or adjusted under 35 U.S.C. 154(b) by 1019 days.

(21) Appl. No.: 17/260,842

(22) PCT Filed: Jul. 10, 2019

(86) PCT No.: PCT/EP2019/068611
§ 371 (c)(1),
(2) Date: Jan. 15, 2021

(87) PCT Pub. No.: WO2020/016083
PCT Pub. Date: Jan. 23, 2020

(65) Prior Publication Data
US 2021/0269091 A1    Sep. 2, 2021

(30) Foreign Application Priority Data

Jul. 19, 2018 (GB) .................................. 1811821

(51) Int. Cl.
*B62D 11/04*    (2006.01)
*B60G 17/018*    (2006.01)
(Continued)

(52) U.S. Cl.
CPC ............ *B62D 11/04* (2013.01); *B60G 17/018* (2013.01); *B60G 17/0195* (2013.01); *B60K 1/02* (2013.01);
(Continued)

(58) Field of Classification Search
CPC ........ B62D 7/04; B62D 11/04; B60G 17/018; B60G 17/0195; B60G 2200/422;
(Continued)

(56) References Cited

U.S. PATENT DOCUMENTS

| 4,473,238 A | * | 9/1984 | Antoine | ............... | B60G 21/055 |
| | | | | | 280/124.13 |
| 5,378,010 A | * | 1/1995 | Marino | ................ | B60G 11/183 |
| | | | | | 280/124.13 |

(Continued)

FOREIGN PATENT DOCUMENTS

| DE | 202014000755 | 5/2015 |
| EP | 1142733 | 10/2001 |
| GB | 2459061 | 10/2009 |

OTHER PUBLICATIONS

PCT Application No. PCT/EP2019/068611, International Search Report and Written Opinion ailed Nov. 4, 2019, 14 pp.

*Primary Examiner* — Tony H Winner
(74) *Attorney, Agent, or Firm* — BKRIP LLC (57) ABSTRACT

A vehicle (10) comprising: a vehicle body (12) defining a longitudinal axis "L"; a suspension system (40) mounted to the vehicle body (12) and connected to a drive wheel (32A, 32B) defining a drive wheel axis "A", the suspension system (40) being configured to allow displacement of the drive wheel axis "A" relative to the vehicle body (12) with a component of the displacement occurring in a direction parallel to the longitudinal axis "L" of the vehicle body (12); a sensor (110) for providing an output indicative of a level of displacement provided by the suspension system (40); and a torque control device (120) for automatically varying torque supplied to the drive wheel (32A, 32B) in dependence upon the output of the sensor (110).

31 Claims, 2 Drawing Sheets

(51) Int. Cl.
  *B60G 17/0195* (2006.01)
  *B60K 1/02* (2006.01)
  *B60L 15/20* (2006.01)
  *B60W 10/20* (2006.01)
  *B60W 10/22* (2006.01)
  *B62D 7/04* (2006.01)

(52) U.S. Cl.
  CPC ............ *B60L 15/2036* (2013.01); *B62D 7/04* (2013.01); *B60G 2200/422* (2013.01); *B60G 2200/44* (2013.01); *B60G 2400/32* (2013.01); *B60W 10/20* (2013.01); *B60W 10/22* (2013.01)

(58) Field of Classification Search
  CPC .. B60G 2200/44; B60G 2400/32; B60K 1/02; B60L 15/2036; B60W 10/20; B60W 10/22
  See application file for complete search history.

(56) References Cited

U.S. PATENT DOCUMENTS

| | | | |
|---|---|---|---|
| 10,988,142 B1* | 4/2021 | Mehrotra | B60W 40/068 |
| 2007/0108681 A1* | 5/2007 | Rhodes | B60G 11/23 |
| | | | 267/273 |
| 2012/0130578 A1* | 5/2012 | Whitfield | B60L 50/10 |
| | | | 298/17 R |
| 2017/0305715 A1* | 10/2017 | Tang | B66B 1/3461 |
| 2018/0334001 A1* | 11/2018 | Kato | B60G 7/008 |
| 2021/0204476 A1* | 7/2021 | Krajewski | A01D 67/00 |
| 2024/0043073 A1* | 2/2024 | Prashant Rao | B62D 49/0678 |

* cited by examiner

SUSPENSION AND STEERING SYSTEMS FOR A VEHICLE

The present invention relates to suspension and steering systems for wheeled vehicles, and particularly but not exclusively to suspension and steering system for motor-driven wheeled vehicles (hereinafter "motor vehicles").

A wide variety of suspension systems for motor vehicles have been developed to date, with increasingly complex arrangements being proposed in pursuit of improved performance and control.

The present applicant has identified the possibility of providing a new type of suspension and steering system offering a number of potential benefits over conventional prior art techniques.

In accordance with a first aspect of the present invention, there is provided a vehicle comprising: a vehicle body defining a longitudinal axis; a suspension system mounted to the vehicle body and connected to a drive wheel defining a wheel axis, the suspension system being configured to allow displacement (e.g. resilient displacement) of the drive wheel axis relative to the vehicle body with a component of the displacement occurring in a direction parallel to the longitudinal axis of the vehicle body; a sensor for providing an output indicative of a level of displacement provided by the suspension system; and a torque control device for automatically varying torque supplied to the drive wheel in dependence upon the output of the sensor.

In this way, a vehicle (e.g. motor vehicle) is provided with an active suspension system configured to automatically adjust height and therefore stiffness of suspension by varying the torque applied to the drive wheel to adjust the suspension in real time to changes in road conditions and dynamic forces resulting from acceleration, braking and cornering at speed. This further provides for improved road handling and/or increased passenger comfort. Furthermore, as the suspension system provides a longitudinal component of displacement parallel to the longitudinal axis of the vehicle, dynamic softening of any disturbance profile is achieved since movement of the drive wheel longitudinally in response to a disturbance (e.g. a bump in a road) will act to expand the time domain within which the unsprung mass of the drive wheel has available to move vertically (i.e. the direction of a conventional suspension strut). Thus the rate of vertical displacement may be substantially reduced resulting in a consequential and substantial reduction in the shock transferred. In contrast, suspension systems known in the art typically require movement of the entire drive wheel, bearing and suspension support structure in a vertical direction, wherein the rate of displacement is directly related to the profile of the disturbance or "bump" in the road.

Typically the suspension system is configured to allow longitudinal displacement of the drive wheel axis relative to a centre position in both a forward and a rearward direction. However, conceivably the system could be configured to allow longitudinal displacement of the drive wheel axis relative to the centre position in a single direction only.

Depending upon whether the component of displacement parallel to the longitudinal axis is in a forward or rearward direction relative to the vehicle, increasing or decreasing the torque supplied to the drive wheel will either act to augment or counter the displacement and/or damping action provided by the suspension system. In this way, selective stiffening or softening of the suspension may be achieved to assist with disturbance damping and/or improving road traction.

The torque control device may be configured to vary torque directed to a further drive wheel of the vehicle to compensate for variations of torque applied to a drive wheel undergoing a disturbance event (e.g. to maintain a desired speed of the vehicle).

Damping of the suspension system may be achieved by mechanical means or by torque applied to the drive wheel.

In another embodiment, the suspension system comprises a resilient rotary mechanism defining a rotary suspension axis extending at an angle to the longitudinal axis of the vehicle body about which the drive wheel axis pivotable (e.g. resiliently pivotable). In one embodiment the drive wheel is connected direct to the resilient rotary mechanism. In another embodiment the drive wheel is connected to the resilient rotary mechanism by an intermediate part (e.g. arm means).

In one embodiment, the resilient rotary mechanism is configured to support the weight of the vehicle body applied to the drive wheel over a range of different levels of displacement.

In one embodiment the rotary suspension axis extends through a part of the drive wheel. In one embodiment at least part or even all of the resilient rotary mechanism is additionally located within the drive wheel.

In one embodiment, the vehicle comprises a motor mounted remotely from the drive wheel (e.g. mounted on the vehicle body) and connected to the drive wheel by a drive mechanism defining a drive axis.

In one embodiment, the resilient rotary mechanism defines a passageway extending therethrough and the drive axis extends through the passageway. Advantageously, such an arrangement allows mechanical attachment of the drive wheel to the vehicle to be simplified in that there has to be only one attachment point with no other mechanisms.

In one embodiment, the rotary suspension axis and drive axis are collinear.

In one embodiment, the vehicle comprises a motor mounted in the drive wheel (e.g. an electric motor). In one embodiment the motor is configured to be mounted around the suspension system (e.g. the motor may comprise an annular rotor/stator pairing defining a central chamber for receiving the suspension system or parts thereof).

In one embodiment the resilient rotary mechanism is a torsional rotary mechanism (i.e. a rotary device in which the pivotal displacement action is provided by torsional deformation of a torsion member).

In one embodiment the torsional rotary mechanism comprises a torsional spring.

Advantageously, since torsional spring may have a very small mass close to its centre of rotation, the suspension system may have a very small moment of inertia allowing a rapid displacement and hence reduce the disturbance felt by passengers in the vehicle.

In one embodiment the suspension system is located on a first lateral side of the vehicle and the torque control device is operative to vary torque supplied to the drive wheel to stiffen the suspension system when the vehicle is turning in a direction opposed to the first lateral side of the vehicle.

In one embodiment the suspension system is located on a first lateral side of the vehicle and the torque control device is operative to vary torque supplied to the drive wheel to soften the suspension system when the vehicle is turning towards the first lateral side of the vehicle.

In one embodiment the torque control device is operative to vary torque supplied to the drive wheel to assist steering the vehicle (e.g. by generating a torque differential between the drive wheel and a further drive wheel of the vehicle).

In one embodiment the rotary suspension axis is inclined (e.g. by an acute angle) relative to the drive wheel axis. In this way the suspension system may be configured to provide for a proportionate change in the wheel-to-ground angle of the drive wheel during cornering. As the vehicle navigates a corner, the vehicle mass displaces to the outside and compresses the outer suspension to a degree (dependent upon the level to which extra torque is applied to the outside wheels during the cornering manoeuvre). As the suspension compresses, then an appropriate angle of misalignment between the wheel axis and the rotary suspension axis results in the wheel progressively tilting into the corner and assisting with stability and traction.

In one embodiment the rotary suspension axis is above the drive wheel axis when the level of displacement provided by the suspension system is at a minimum. In another embodiment the rotary suspension axis is below the drive wheel axis when the level of displacement provided by the suspension system is at a minimum. The vertical positioning of the rotary suspension axis will depend upon whether the rotary suspension axis is in advance of or rearward of the wheel axis and/or upon whether the drive wheel is a front or rear wheel of the vehicle.

In one embodiment the rotary suspension axis is positioned rearward of the drive wheel axis (e.g. when the dual-wheel module is a front wheel module).

In another embodiment the rotary suspension axis is positioned in advance of the drive wheel axis (e.g. when the dual-wheel module is a rear wheel module).

In one embodiment the suspension system further provides a secondary suspension action (e.g. configured to allow resilient displacement of the drive wheel axis in response to a force acting along a line connecting the drive wheel axis and rotary suspension axis of a rotary suspension system). In one embodiment the secondary suspension action is provided with a mechanical damper.

In one embodiment the secondary suspension action is provided by a secondary resilient rotary mechanism defining a secondary rotary suspension axis.

In one embodiment the secondary resilient rotary mechanism is configured to provide a resilient pivot in an opposite sense to the first-defined resilient rotary mechanism.

In one embodiment the second rotary suspension axis is positioned on an opposed side of the drive wheel axis to the first-defined rotary suspension axis.

In one embodiment the further rotary suspension axis extends through a part of the drive wheel.

In one embodiment the suspension system and drive wheel are provided as a unitary module for installation in the vehicle.

In one embodiment the vehicle additionally comprises: a further suspension system mounted to the vehicle body and connected to a further drive wheel defining a further drive wheel axis, the further suspension system being configured to allow displacement of the further drive wheel axis relative to the vehicle body with a component of the displacement occurring in a direction parallel to the longitudinal axis of the vehicle body; and a further sensor for providing an output indicative of a level of displacement provided by the further suspension system; wherein the torque control device is further configured to automatically vary torque supplied to the further drive wheel in dependence upon the output of the further sensor.

The torque control device may comprise a central processor for controlling torque supplied to both the first-defined and further drive wheels or may comprise a separate processor for each drive wheel.

In one embodiment the first-defined drive wheel and further drive wheel are front wheels of the vehicle.

In one embodiment the first-defined drive wheel and further drive wheel are rear wheels of the vehicle.

In accordance with a second aspect of the present invention there is provided a method of controlling stiffness (or displacement) in a suspension system mounted to a vehicle body defining a longitudinal axis, the suspension system being connected to a drive wheel defining a drive wheel axis and configured to allow displacement (e.g. resilient displacement) of the drive wheel axis relative to the vehicle body with a component of the displacement occurring in a direction parallel to the longitudinal axis of the vehicle body, the method comprising the computer-implemented steps of: receiving from a sensor an output indicative of a level of displacement provided by the suspension system; determining whether the output is indicative that the level of displacement provided by the suspension system is above or below a predetermined level; and automatically varying torque supplied to the drive wheel to increase or decrease the stiffness of the suspension system.

Embodiments of the second aspect of the present invention correspond to the embodiments of the first aspect of the present invention defined above.

In accordance with a third aspect of the present invention there is provided a computer program comprising program instructions for causing a computer to perform the method of the second aspect of the present invention.

In accordance with a fourth aspect of the present invention, there is provided a vehicle (e.g. motor vehicle) comprising: a vehicle body defining a longitudinal axis; a suspension system mounted to the vehicle body and connected to a wheel (e.g. drive or non-drive wheel), the suspension system comprising a resilient rotary mechanism defining a rotary suspension axis extending at an angle to the longitudinal axis of the vehicle body about which the wheel axis is pivotable (e.g. resiliently pivotable) to allow a component of displacement of the wheel axis relative to the vehicle body in a direction parallel to the longitudinal axis of the vehicle body.

In one embodiment, the resilient rotary mechanism is configured to support the weight of the vehicle body applied to the wheel over a range of different levels of displacement.

In one embodiment the wheel is connected direct to the resilient rotary mechanism. In another embodiment the wheel is connected to the resilient rotary mechanism by an intermediate part (e.g. arm means).

In one embodiment, the rotary suspension axis extends through a part of the drive wheel. In one embodiment, at least part or even all of the resilient rotary mechanism is additionally located within the drive wheel.

In one embodiment, the vehicle comprises a motor mounted remotely from the wheel (e.g. mounted on the vehicle body) and connected to the wheel by a drive mechanism defining a drive axis.

In one embodiment, the resilient rotary mechanism defines a passageway extending therethrough and the drive axis extends through the passageway.

In one embodiment, the rotary suspension axis and drive axis are collinear.

In one embodiment, the vehicle comprises a motor mounted in the wheel (e.g. an electric motor). In one embodiment the motor is configured to be mounted around the suspension system (e.g. the motor may comprise an annular rotor/stator pairing defining a central chamber for receiving the suspension system for parts thereof).

In one embodiment the resilient rotary mechanism is a torsional rotary mechanism (i.e. a device in which the resilient pivot action is provided by torsional deformation of a torsion member).

In one embodiment the resilient rotary mechanism comprises a torsional spring.

In one embodiment the rotary suspension axis is inclined (e.g. by an acute angle) relative to the wheel axis.

In one embodiment the rotary suspension axis is above the drive wheel axis when the level of displacement provided by the suspension system is at a minimum. In another embodiment the rotary suspension axis is below the drive wheel axis when the level of displacement provided by the suspension system is at a minimum.

In one embodiment the rotary suspension axis is positioned rearward of the wheel axis (e.g. when the dual-wheel module is a front wheel module).

In another embodiment the rotary suspension axis is positioned in advance of the wheel axis (e.g. when the dual-wheel module is a rear wheel module).

In one embodiment the suspension system further provides a secondary suspension action (e.g. configured to allow resilient displacement of the wheel axis in response to a force acting along a line connecting the drive wheel axis and the rotary suspension axis of the rotary suspension system). In one embodiment the secondary suspension action is provided with a mechanical damper.

In one embodiment the secondary suspension action is provided by a secondary resilient rotary mechanism defining a secondary rotary suspension axis.

In one embodiment the secondary resilient rotary mechanism is configured to provide a resilient pivot action in an opposite sense to the first-defined resilient rotary mechanism.

In one embodiment the second rotary suspension axis is positioned on an opposed side of the wheel axis to the first-defined rotary suspension axis.

In one embodiment the further rotary suspension axis extends through a part of the wheel.

In one embodiment the suspension system and wheel are provided as a unitary module for installation in the vehicle.

In one embodiment the vehicle additionally comprises a further suspension system as previously defined mounted to the vehicle body and connected to a further wheel.

In one embodiment the first-defined wheel and further wheel are front wheels of the vehicle.

In one embodiment the first-defined wheel and further wheel are rear wheels of the vehicle.

In accordance with a fifth aspect of the present invention, there is provided a vehicle comprising: a vehicle body; a dual-wheel module coupled to the vehicle body, the dual-wheel module including a drive wheel assembly comprising a first drive wheel having a first wheel axis and a second drive wheel having a second wheel axis, the drive wheel assembly being pivotally mounted relative to the vehicle body about a pivot axis whereby pivotal movement of the drive wheel assembly relative to the vehicle body results in steering movement of the first and second wheel axes relative to the vehicle body; a steering sensor for providing an output indicative of a lateral steering direction provided by a user; and a torque control device for varying torque applied to the first drive wheel relative to the second drive wheel in dependence upon the output of the steering sensor to generate a turning moment about the pivot axis for pivoting the drive wheel assembly relative to the vehicle body towards the lateral steering direction provided by a user.

In this way, a vehicle (e.g. motor vehicle) is provided in which steering is achieved by applying a torque differential to a pivotable drive wheel assembly of a dual-wheel module without the need for a mechanical steering mechanism. Advantageously, tyre wear may be reduced since a single wide tyre is replaced by two narrower tyres, each of which rotate about a common axis with reduced scrub action thereby giving the potential to substantially prolong the life of the types and increase energy efficiency. Furthermore, for a vehicle comprising a plurality of dual-wheel modules (e.g. a front left and right pair of dual-wheel modules or even a front and rear pair of left and right dual-wheel modules) each dual-wheel pair is steerable independently of the others allowing left and right wheel pairs to be directed to different angles (e.g. to optimise wheel positions during a turning manoeuvre) or in the event that steering control of one module is lost.

In one embodiment the torque control device is configured to provide a plurality of discrete torque ratios between maximum and minimum torque ratios. In another embodiment the torque control device is configured to provide continuous torque ratios between maximum and minimum torque ratios.

Since steering of the drive wheel assembly of the dual-wheel module requires only a torque differential between the first and second drive wheels, the torque control device may be configured to provide a full range of torque ratios with a constant total torque being applied to the dual-wheel module (e.g. to enable turning of the dual-wheel module without any loss of power).

In one embodiment the first wheel axis and second wheel axis are collinear.

In one embodiment the vehicle further comprises a dual-wheel module position sensor for providing an output indicative of the angular orientation of the first and second wheel axes relative to the vehicle. In this way, the torque control device can be provided with feedback of the angular orientation of the drive wheel assembly and selectively apply an appropriate steering torque differential if a change in the angular orientation of the first and second wheel axes is required in order to direct the drive wheel assembly towards the lateral steering direction indicated by the steering sensor output.

In one embodiment the dual-wheel module further comprises a suspension system for coupling the drive wheel assembly to the vehicle body. The suspension system may be configured to allow displacement of the first and second drive wheels collectively or to allow displacement of the first and second drive wheels independently.

In one embodiment the suspension system is configured to allow displacement resilient displacement) of the drive wheel assembly relative to the vehicle body with a component of the displacement occurring in a direction parallel to a longitudinal axis of the vehicle body.

In one embodiment the suspension system comprises a resilient rotary mechanism defining a rotary suspension axis extending at an angle to a longitudinal axis of the vehicle body about which the drive wheel assembly is pivotable (e.g. resiliently pivotable).

In one embodiment, the rotary suspension axis extends through a part of at least one of the first and second drive wheels.

In one embodiment the rotary suspension axis is positioned rearward of the first and second wheel axes (e.g. when the dual-wheel module is a front wheel module).

In another embodiment the rotary suspension axis is positioned in advance of the first and second wheel axes (e.g. when the dual-wheel module is a rear wheel module).

In one embodiment the suspension system further provides a secondary suspension action (e.g. configured to allow resilient displacement of the drive wheel assembly in response to a force acting along a line connecting the first and second wheel axes and the rotary suspension axis of a rotary suspension system). In one embodiment the secondary suspension action is provided with a mechanical damper.

In one embodiment the secondary suspension action is provided by a secondary resilient rotary mechanism defining a secondary rotary suspension axis.

In one embodiment the secondary resilient rotary mechanism is configured to providing a resilient pivot action in an opposite sense to the first-defined resilient rotary mechanism.

In one embodiment the second rotary suspension axis is positioned on an opposed side of the first and second wheel axes to the first-defined rotary suspension axis.

In one embodiment the secondary rotary suspension axis extends through a part of at least one of the first and second drive wheels.

In one embodiment the steering input device comprises an angular position sensor (e.g. for tracking rotational movement of a steering wheel of the vehicle) or a joystick input device.

In one embodiment the dual-wheel module comprises a first wheel-mounted motor (e.g. first wheel-mounted electric motor) in the first drive wheel and a second wheel-mounted motor (e.g. second wheel-mounted electric motor) in the second drive wheel.

In one embodiment the vehicle comprises a further dual-wheel module as previously defined positioned on an opposed lateral side of the vehicle to the first-defined dual-wheel module.

In one embodiment the torque control device is configured to pivot the drive wheel assembly of the first-defined dual-wheel module and the drive wheel assembly of the further dual-wheel module to different angles when the vehicle is turning.

In one embodiment the first-defined dual-wheel module and further dual-wheel module are front wheel modules of the vehicle.

In one embodiment the first-defined dual-wheel module and further dual-wheel module are rear wheel modules of the vehicle.

In accordance with a sixth aspect of the present invention, there is provided a method of steering a vehicle comprising a dual-wheel module including a drive wheel assembly comprising a first drive wheel having a first wheel axis and a second drive wheel having a second wheel axis, the drive wheel assembly being pivotally mounted relative to the vehicle body about a pivot axis whereby pivotal movement of the drive wheel assembly relative to the vehicle body results in steering movement of the first and second wheel axes relative to the vehicle body, the method comprising the computer-implemented steps of: receiving from a steering sensor an output indicative of a lateral steering direction provided by a user; and automatically varying torque applied to the first drive wheel relative to the second drive wheel in dependence upon the output of the steering sensor to generate a turning moment about the pivot axis for pivoting the drive wheel assembly relative to the vehicle body towards the lateral steering direction provided by a user.

Embodiments of the sixth aspect of the present invention correspond to embodiments of the fifth aspect of the present invention defined above.

In accordance with a seventh aspect of the present invention, there is provided a computer program comprising program instructions for causing a computer to perform the method of the sixth aspect of the present invention.

Embodiments of the present invention will now be described by way of example with reference to the accompanying drawings in which.

Figure 1:
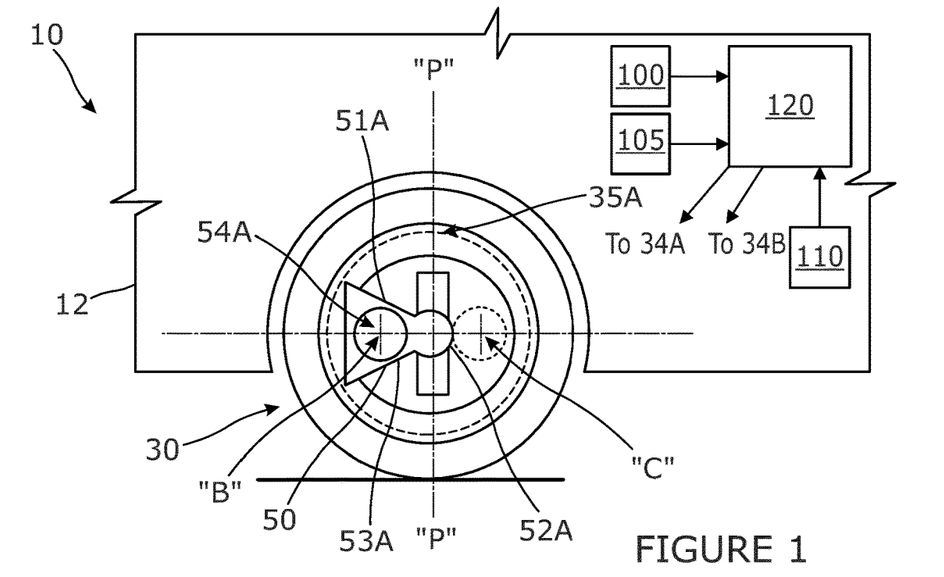
FIG. 1 shows a schematic side view of a section of a motor vehicle including a steerable dual-wheel module according to a first embodiment of the present invention.
Figure 2:
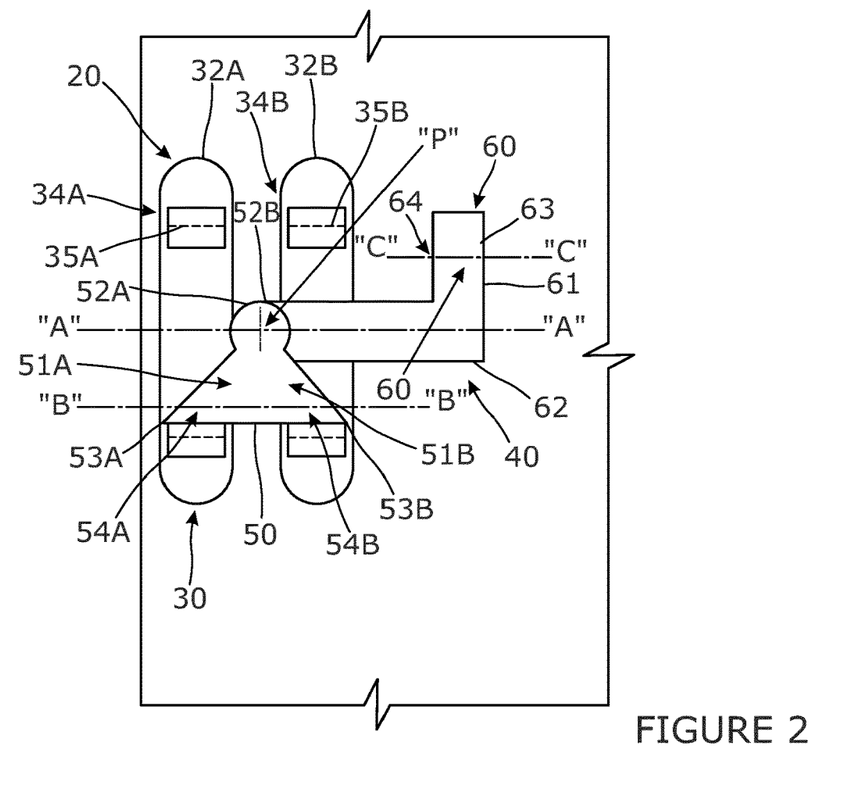
FIG. 2 shows a schematic plan view of the dual-wheel module of FIG. 1.
Figure 3:
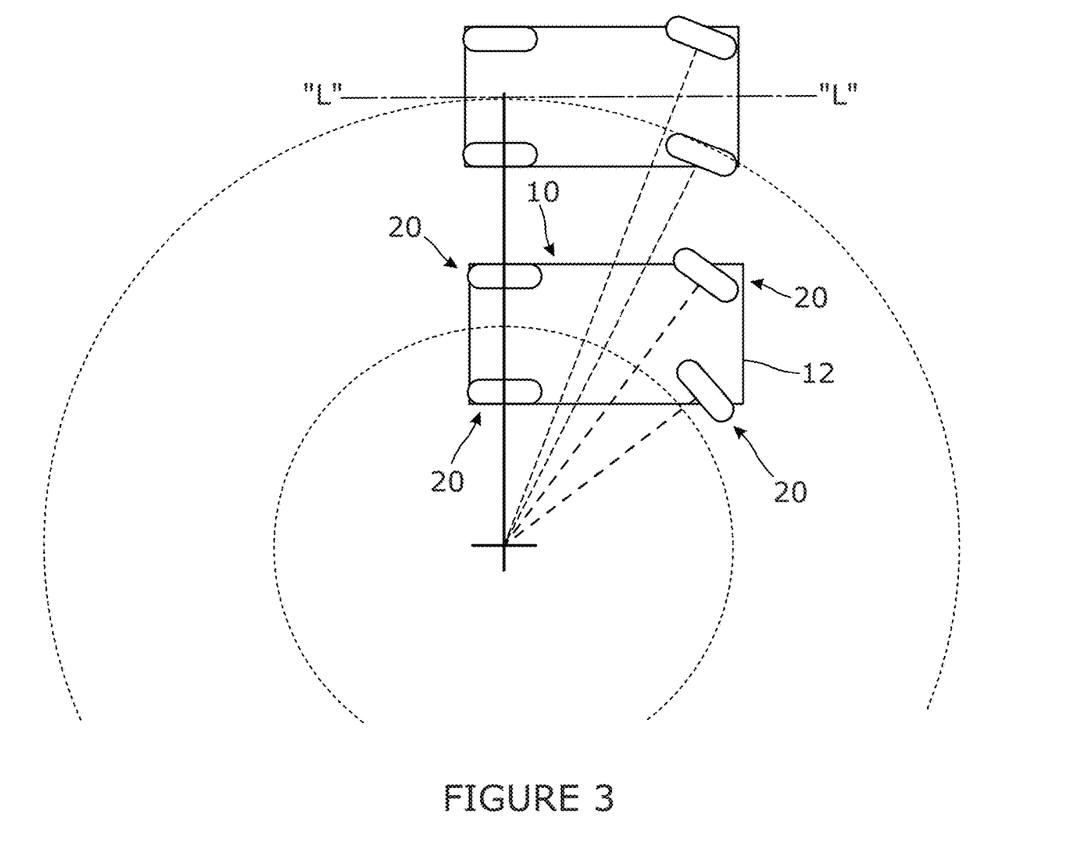
FIG. 3 shows a schematic view of a motor vehicle incorporating front and rear pairs of dual-wheel modules of the type shown in FIG. 1 during first and second turning manoeuvres.

FIGS. 1-3 show a motor vehicle 10 comprising: a vehicle body 12 defining a longitudinal (i.e. front-to-rear) axis "L"; pairs of front and rear dual-wheel modules 20 coupled to vehicle body 12 at each of its four corners; a steering sensor 100; a dual-wheel module position sensor 105; a displacement level sensor 110; and a torque control device 120.

Each dual-wheel module 20 comprises a drive wheel assembly 30 and suspension system 40 for coupling drive wheel assembly 30 to vehicle body 12.

Drive wheel assembly 30 comprises a first drive wheel 32A including a first wheel-mounted annular electric motor 34A including outer rotor and inner stator interface 35A and a second drive wheel 32B including a second wheel-mounted annular electric motor 34B including outer rotor and inner stator interface 35B, the first and second drive wheels 32A, 32B each having a common central wheel axis "A". Each drive wheel assembly 30 is pivotally coupled to vehicle body 12 about a pivot axis "P" (i.e. with first and second drive wheels 32A, 32B of each drive wheel assembly 30 pivoting a pair) whereby pivotal movement of drive wheel assembly 30 relative to vehicle body 12 results in steering movement of common wheel axis "A" relative to vehicle body 12.

Suspension system 40 comprises: an integrated primary torsional rotary mechanism 50 located within drive wheel assembly 30, the primary torsional rotary mechanism 50 being configured to exclusively counterbalance the weight of vehicle body 12 applied to drive wheel assembly 30 over a range of different levels of displacement action (i.e. through its full range of displacement positions without requiring any further suspension support acting in parallel thereto) and provide a component of resilient displacement parallel to longitudinal axis "L" of vehicle body 12; and a secondary torsional rotary mechanism 60 configured to provide a resilient pivot action in an opposite sense the primary torsional rotary mechanism 50.

Primary torsional rotary mechanism 50 comprises: a first component 51A having a first part 52A connected to first drive wheel 32A along central wheel axis "A" and a second part 53A spaced longitudinally from the central wheel axis "A", the second part 53A connected to a first torsional spring 54A defining a rotary suspension axis "B" extending normal to longitudinal axis "L" of vehicle body 12 and through first drive wheel 32A; and a second component 51B having a first part 52B connected to second drive wheel 32B along central wheel axis "A" and a second part 53B spaced longitudinally from the central wheel axis "A", the second part 53B connected to a second torsional spring 54B defining a rotary suspension axis collinear with rotary suspension axis "B" defined by first torsional spring 54A and extending through second drive wheel 32B.

Secondary torsional rotary mechanism 60 comprises an arm 61 having a first part 62 connected (e.g. pivotally connected) to primary torsional rotary mechanism 50 at a location along central wheel axis "A" and a second part 63 connected to a torsional spring 64 defining a rotary suspension axis "C" extending on an opposed side of central wheel axis "A" and parallel to rotary suspension axis "B" defined by torsional spring 54A.

In use steering sensor 100 is configured to provide an output indicative of a lateral steering direction provided by a user (e.g. by tracking movement of a steering wheel or joystick controller used by the user to steer vehicle 10) whilst displacement level sensor 110 is configured to provide an output indicative of the level of displacement provided by suspension system 40 (e.g. by monitoring the angular position of components 51A, 51B and 61). The outputs of steering sensor 100, dual-wheel module position sensor 105 and displacement level sensor 110 are provided to torque control device 120 which includes a computer processor programmed to: a) automatically vary torque applied by motor 34A to the first drive wheel 32A and the torque applied by motor 34B to second drive wheel 32B to generate a torque differential in dependence upon the output of steering sensor 100 to generate a turning moment about pivot axis "P" for pivoting drive wheel assembly 30 relative to vehicle body 12 towards the lateral steering direction provided by a user; and b) automatically vary torque supplied by motors 34A, 34B to first and second drive wheels 32A, 32B in dependence upon the output of displacement level sensor 110.

Suspension system 40 provides for each drive wheel 32A, 32B to rotate independently about offset rotary suspension axis "B" allowing inertial mass and hence shock impact of a rapid disturbance/sever bump in a road to be reduced relative to a conventional vertical suspension strut for two reasons: 1) the mass required to move is potentially reduced by virtue of having no linear moving suspension components, only rotation of the wheel about rotary suspension axis "B" and torsional displacement of the torsional spring; and since a component of the movement of the drive wheels in response to the impact will be in the opposite direction to the impact the rate of vertical displacement is reduced resulting a lower effective slope of impact (i.e. edge severity reduction effect).

Drive wheels 32A, 32B pivot together around rotary suspension axis "C" for a second suspension action provided by secondary torsional rotary mechanism 60 that acts in the opposite sense to counter primary torsional rotary mechanism 50. Although secondary torsional rotary mechanism 60 is not essential, there are dynamic conditions that make it desirable for the second (counter) suspension action to be available. One benefit is that of an extended travel of suspension, being the sum of the movement of the first and second suspension actions. This is desirable when the terrain is particularly uneven. However, another benefit relate to the front wheels and is described in more detail below.

When negotiating a corner the centrifugal force on a vehicle acts to compress the suspension on the side of the vehicle furthest from the centre of the curved path followed by the vehicle. Under these conditions the outer wheels may benefit from additional torque since the outer wheels are able deliver greater traction than the inner wheels due the weight distribution effect of the centrifugal force. Additionally the rear wheel on the outer side can deliver most torque and by applying this torque it would be desirable to cause the vehicle body to rise as a consequence thus helping to counteract the effect of the centrifugal force. In the described embodiment this would be achieved by providing the rear pair of dual-wheel modules with a trailing pivot (i.e. with central wheel axis "A" trailing rotary suspension axis "B"). However, the front wheels may be better served with a leading pivot arrangement (i.e. with central wheel axis "A" leading rotary suspension axis "B") since in this arrangement torque control device 120 may be configured to provide the inner front wheel with a greater level of torque compared to the outer front wheel resulting in the front inner corner of the vehicle being lowered. Simultaneously torque control device 120 may be configured to provide the outer front wheel with a reduced level of torque thereby allowing the front outer corner of the vehicle to rise (the extent to which it rises will be a function of the speed and hence centrifugal force relative to the suspension stiffness). Accordingly, some degree of control can be applied during cornering of the vehicle simply by varying the torque delivery proportions to each wheel.

The benefit of the secondary suspension action is particularly important for the front wheels in the above application since one drawback of a leading pivot arrangement geometry is that an impact can act to directly apply force to the vehicle body as the shock force is potentially transmitted in line with components 51A, 51B. By including the addition of the secondary suspension action provided by secondary torsional rotary mechanism 60 such impact is dealt with by the initial rotation of arm 61.

Steering sensor 100, dual-wheel module position sensor 105 and torque control device 120 act together to form a control loop that applies a different driving torque level to the first and second drive wheels 32A, 32B of each dual-wheel module 20. The torque differential imposes a moment about axis "P" (i.e. vertical axis when the vehicle is on a horizontal surface) and the dual wheels together rotate about axis "P". The most extreme of this action can be envisaged by considering the stationary condition when there is a need to reposition the alignment of the drive wheel assembly 30 relative to vehicle body 12. By applying a positive torque to one of the drive wheels and a negative torque to the other, rotation of the drive wheel assembly 30 about axis "P" is established once the initial static friction forces are overcome. As the wheel pair pirouette about axis "P" torque control device 120 receives feedback of the rotational position of drive wheel assembly 30 from dual-wheel module position sensor 105 and moderates the torque differential to balance off the input demand detected via steering sensor 100.

Advantageously the first and second wheels 32A, 32B rotate about axis "P" with little or eve no tyre scrub since each wheel is effectively travelling in a circle about axis "P". Scrub is limited to a much narrower tyre (compared with a conventional single-wheel arrangement) which is simultaneously effectively travelling in the direction of the drive rotation, whilst it revolves about central vertical axis "P". This control system also ensures the tracking or coordinated alignment of both left and right side dual-wheel modules 20 wheel pairs are controlled. Thus the left and right drive wheel assemblies can be pointed together without the need for any mechanical linkage between them.

As illustrated in FIG. 3, left and right drive wheel assemblies can advantageously be directed to different angles (i.e.

with the left and right wheel pairing being non-parallel) during turning manoeuvres (e.g. cornering of a vehicle). This is important since the radius of any chosen turning circle requires a different angle for left and right wheel pairs. At all steering angles other than straight ahead, the left and right wheels/wheel pairs are required to be at different angles to each other for optimum performance and these angles change for each turning circle dimension.

Figure 4:
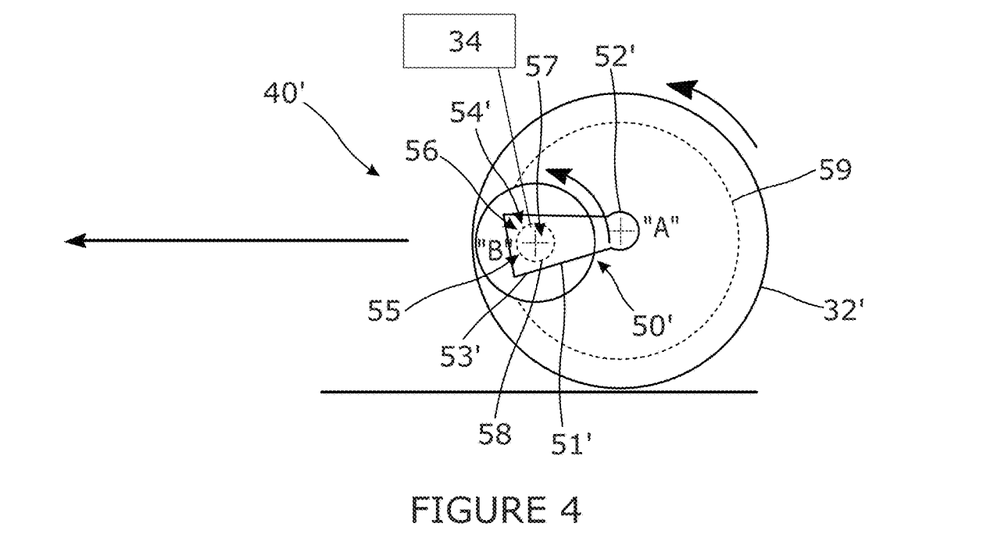
FIG. 4 shows a schematic side view of a suspension system according to a second embodiment of the present invention.

FIG. 4 shows a suspension system 40' according to a second embodiment of the present invention for connection to a motor 34 mounted remotely from a drive wheel 32' (e.g. a central electric motor or combustion engine mounted on a vehicle body and connected to the drive wheels of the vehicle via a drive mechanism) rather than a wheel-mounted motor.

Suspension system 40' comprises a torsional rotary mechanism 50' comprising a component 51' including a first part 52' connected to drive wheel 32' along central wheel axis "A" and a second part 53' spaced longitudinally from the central wheel axis "A", the second part 53' connected to a torsional spring 54' defining passageway 55 extending through which a rotary suspension axis "B" of the torsional spring 54' extends. Torque is transmitted to drive wheel 32' from the remotely mounted motor via a drive mechanism 56 defining a drive axle 57 extending through passageway 55 along axis "B" and having a drive pinion 58 configured to mesh with an internal gear 59 of drive wheel 32'.

The invention claimed is:

1. A vehicle comprising:
    a vehicle body;
    a dual-wheel module coupled to the vehicle body, the dual-wheel module including a drive wheel assembly comprising a first drive wheel having a first wheel axis and a second drive wheel having a second wheel axis, the drive wheel assembly being pivotally mounted relative to the vehicle body about a pivot axis whereby pivotal movement of the drive wheel assembly relative to the vehicle body results in steering movement of the first and second wheel axes relative to the vehicle body;
    a steering sensor for providing an output indicative of a lateral steering direction provided by a user; and
    a torque control device for varying torque applied to the first drive wheel relative to the second drive wheel in dependence upon the output of the steering sensor to generate a turning moment about the pivot axis for pivoting the drive wheel assembly relative to the vehicle body towards the lateral steering direction provided by a user.

2. A vehicle according to claim 1, further comprising a dual-wheel module position sensor for providing an output indicative of the angular orientation of the first and second wheel axes relative to the vehicle.

3. A vehicle according to claim 1, wherein the dual-wheel module further comprises a suspension system for coupling the drive wheel assembly to the vehicle body.

4. A vehicle according to claim 3, wherein the suspension system is configured to allow displacement of the drive wheel assembly relative to the vehicle body with a component of the displacement occurring in a direction parallel to a longitudinal axis of the vehicle body.

5. A vehicle according to claim 4, wherein the suspension system comprises a resilient rotary mechanism defining a rotary suspension axis extending at an angle to a longitudinal axis of the vehicle body about which the drive wheel assembly is pivotable.

6. A vehicle according to claim 5, wherein the rotary suspension axis extends through a part of at least one of the first and second drive wheels.

7. A vehicle according to claim 5, wherein the rotary suspension axis is positioned rearward of the first and second wheel axes.

8. A vehicle according to claim 5, wherein the rotary suspension axis is positioned in advance of the first and second wheel axes.

9. A vehicle according to claim 5, wherein the suspension system further provides a secondary suspension action.

10. A vehicle according to claim 5, wherein the secondary suspension action is provided by a secondary resilient rotary mechanism defining a secondary rotary suspension axis.

11. A vehicle according to claim 10, wherein the secondary resilient rotary mechanism is configured to provide a resilient pivot action in an opposite sense to the first-defined resilient rotary mechanism.

12. A vehicle according to claim 11, wherein the second rotary suspension axis is positioned on an opposed side of the first and second wheel axes to the first-defined rotary suspension axis.

13. A vehicle according to claim 10, wherein the secondary rotary suspension axis extends through a part of at least one of the first and second drive wheels.

14. A vehicle according to claim 1, wherein the steering input device comprises an angular position sensor or a joystick input device.

15. A vehicle according to claim 1, wherein the dual-wheel module comprises a first wheel-mounted motor in the first drive wheel and a second wheel-mounted motor in the second drive wheel.

16. A vehicle according to claim 1, wherein the vehicle comprises a further dual-wheel module as previously defined positioned on an opposed lateral side of the vehicle to the first-defined dual-wheel module.

17. A vehicle according to claim 16, wherein the torque control device is configured to pivot the drive wheel assembly of the first-defined dual-wheel module and the drive wheel assembly of the further dual-wheel module to different angles when the vehicle is turning.

18. A vehicle according to claim 16, wherein the first-defined dual-wheel module and further dual-wheel module are front wheel modules of the vehicle.

19. A vehicle according to claim 16, wherein the first-defined dual-wheel module and further dual-wheel module are rear wheel modules of the vehicle.

20. A method of steering a vehicle comprising a dual-wheel module including a drive wheel assembly comprising a first drive wheel having a first wheel axis and a second drive wheel having a second wheel axis, the drive wheel assembly being pivotally mounted relative to the vehicle body about a pivot axis whereby pivotal movement of the drive wheel assembly relative to the vehicle body results in steering movement of the first and second wheel axes relative to the vehicle body, the method comprising the computer-implemented steps of:
    receiving from a steering sensor an output indicative of a lateral steering direction provided by a user; and
    automatically varying torque applied to the first drive wheel relative to the second drive wheel in dependence upon the output of the steering sensor to generate a turning moment about the pivot axis for pivoting the drive wheel assembly relative to the vehicle body towards the lateral steering direction provided by a user.

21. A computer program comprising program instructions for causing a computer to perform the method of claim 20.

22. A vehicle comprising:
a vehicle body defining a longitudinal axis; and
a suspension system mounted to the vehicle body and connected to a wheel defining a wheel axis, the suspension system comprising a resilient rotary mechanism configured to support the weight of the vehicle body applied to the drive wheel over a range of different levels of displacement, the resilient rotary mechanism defining a rotary suspension axis about which the wheel axis is pivotable, the rotary suspension axis extending at an angle to the longitudinal axis of the vehicle body to allow a component of displacement of the wheel axis relative to the vehicle body in a direction parallel to the longitudinal axis of the vehicle body;
wherein:
the vehicle comprises a motor mounted remotely from the wheel and connected to the wheel by a drive mechanism defining a drive axis; and
the resilient rotary mechanism defines a passageway extending therethrough and the drive axis extends through the passageway.

23. A vehicle comprising:
a vehicle body defining a longitudinal axis; and
a suspension system mounted to the vehicle body and connected to a wheel defining a wheel axis, the suspension system comprising a resilient rotary mechanism configured to support the weight of the vehicle body applied to the drive wheel over a range of different levels of displacement, the resilient rotary mechanism defining a rotary suspension axis about which the wheel axis is pivotable, the rotary suspension axis extending at an angle to the longitudinal axis of the vehicle body to allow a component of displacement of the wheel axis relative to the vehicle body in a direction parallel to the longitudinal axis of the vehicle body;
wherein the rotary suspension axis is positioned rearward of the wheel axis.

24. A vehicle comprising:
a vehicle body defining a longitudinal axis; and
a suspension system mounted to the vehicle body and connected to a wheel defining a wheel axis, the suspension system comprising a resilient rotary mechanism configured to support the weight of the vehicle body applied to the drive wheel over a range of different levels of displacement, the resilient rotary mechanism defining a rotary suspension axis about which the wheel axis is pivotable, the rotary suspension axis extending at an angle to the longitudinal axis of the vehicle body to allow a component of displacement of the wheel axis relative to the vehicle body in a direction parallel to the longitudinal axis of the vehicle body;
wherein the suspension system further provides a secondary suspension action.

25. A vehicle according to claim 24, wherein the secondary suspension action is provided by a secondary resilient rotary mechanism defining a secondary rotary suspension axis.

26. A vehicle according to claim 25, wherein the secondary rotary mechanism is configured to provide resilient pivot action in an opposite sense to the first-defined resilient rotary mechanism.

27. A vehicle according to claim 26, wherein the second rotary suspension axis is positioned on an opposed side of the wheel axis to the first-defined rotary suspension axis.

28. A vehicle according to claim 25, wherein the further rotary suspension axis extends through a part of the wheel.

29. A vehicle comprising:
a vehicle body defining a longitudinal axis; and
a suspension system mounted to the vehicle body and connected to a wheel defining a wheel axis, the suspension system comprising a resilient rotary mechanism defining a rotary suspension axis extending at an angle to the longitudinal axis of the vehicle body about which the wheel axis is pivotable to allow a component of displacement of the wheel axis relative to the vehicle body in a direction parallel to the longitudinal axis of the vehicle body;
wherein the vehicle additionally comprises a further suspension system mounted to the vehicle body and connected to a further wheel.

30. A vehicle according to claim 29, wherein the first-defined wheel and further wheel are front wheels of the vehicle.

31. A vehicle according to claim 29, wherein the first-defined wheel and further wheel are rear wheels of the vehicle.

* * * * *